United States Patent [19]

Thayer et al.

[11] Patent Number: 4,461,707
[45] Date of Patent: Jul. 24, 1984

[54] ULTRAFILTRATION AND REVERSE OSMOSIS TUBULAR MEMBRANE MODULE

[75] Inventors: William L. Thayer; Adam J. Bennett, both of Ottawa; Oleh Kutowy, North Gower; Srinivasa Sourirajan, Ottawa, all of Canada

[73] Assignee: Canadian Patents & Development Limited, Ottawa, Canada

[21] Appl. No.: 316,963

[22] Filed: Oct. 30, 1981

[51] Int. Cl.³ .............................................. B01D 31/00
[52] U.S. Cl. .............................. 210/321.1; 210/323.2; 210/339; 210/433.2; 210/450; 210/455
[58] Field of Search .................... 210/232, 321, 323.2, 210/433, 336, 339, 450, 451, 455; 55/158; 422/48

[56] References Cited

U.S. PATENT DOCUMENTS

| | | | |
|---|---|---|---|
| 3,581,900 | 6/1971 | Clark | 210/321.1 |
| 3,666,109 | 5/1972 | Goeldner | 210/433.2 X |
| 3,708,069 | 1/1973 | Clark | 210/433.2 X |
| 3,977,967 | 8/1976 | Trulson et al. | 210/433.2 X |
| 4,177,031 | 12/1979 | Thayer et al. | 210/500.2 X |

*Primary Examiner*—David R. Sadowski
*Attorney, Agent, or Firm*—Francis W. Lemon

[57] ABSTRACT

An ultrafiltration and reverse osmosis module comprising a tubular casing having a plurality of tubular membrane assemblies spaced therein by spacing plates, in stepped end portions of the casing bore, and held therein by sealing plates clamped to flanges on the ends of the casing. The tubular membrane assemblies are sealed around bores in the spacing plates and boxes in the sealing plates by "O"-rings and are held against collapse by sleeves in the ends of the tubular membrane assemblies.

2 Claims, 4 Drawing Figures

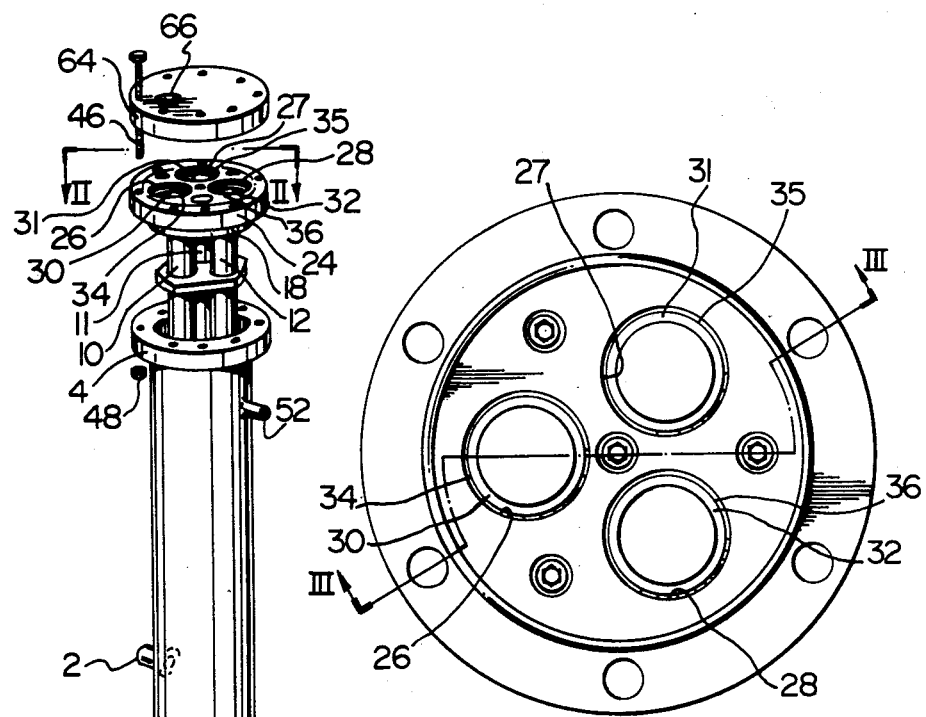
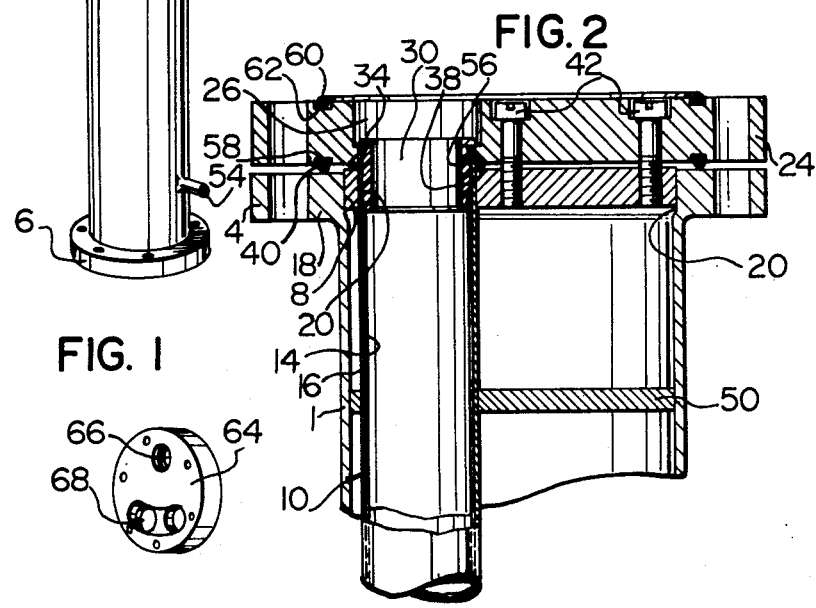
FIG. 1  FIG. 2  FIG. 3  FIG. 4

ULTRAFILTRATION AND REVERSE OSMOSIS TUBULAR MEMBRANE MODULE

This invention relates to ultrafiltration and reverse osmosis tubular membrane modules.

It has already been proposed in, for example U.S. Pat. Nos. 3,666,109 (Goeldner) and 3,977,967 (Trulson et al) to provide ultrafiltration and reverse osmosis tubular membrane modules wherein a plurality of semi-permeable membranes on porous tubular supports are supported in a tubular casing and sealed to tube sheets at the ends of the tubular casing.

While these modules have proved to be useful there is still a need for a module wherein:

(a) a full mechanical seal is provided while each semi-permeable membrane tube is supported internally by a sleeve insert and sealed externally by, for example, an O-ring;

(b) the capability of removing the semi-permeable membrane tubes and reassembling them after storage is provided;

(c) the seal can be proven leak tight by a carbon analyser in parts per million;

(d) the module can be used through a heat range from −25° C. to 80° C.;

(e) the module can be operated in pressures from 1–500 lbs., depending on whether a screen or fiberglass support is used for each of the semi-permeable membrane tubes;

(f) the sleeve insert adds support for the end of the semi-permeable membrane tubes and protection from very abrasive particles;

and wherein the module is versatile for operating in small or large systems because;

(a) a tubular casing contains all the internal parts and can be handled as a single unit;

(b) the tubular casing can, if desired, collect all of the permeate;

(c) the module can be assembled in in series flow with another module, with no extra parts, by being simply bolted end to end therewith or by using U bends;

(d) parallel flow or series flow along the semi-permeable membrane tubes of a module can be obtained by adding a header plate to one or several modules in a line;

(e) the tubular casing allows positive pressure to be applied to the outside of the membrane during operation; in a back flush cycle;

According to the present invention there is provided an ultrafiltration and reverse osmosis tubular membrane module, comprising:

(a) an elongated, open ended tubular casing having a liquid outlet, connecting flanges at each end, and stepped bore portions at each end, (b) a plurality of tubular membrane assemblies each comprising an inner, membrane tube and an outer porous, support tube supporting the membrane tube, each tubular membrane assembly extending along, and out of each end of, the casing, (c) two spacer plates each having, for each tubular membrane assembly, a tubular membrane assembly locating hole, each spacer plate being located one at each end of the tubular casing and in the stepped bore portion at that end, (d) two sealing plates, one at each end of the tubular casing and covering the spacer plate and the tubular casing flange at that end, the sealing plates each having stepped, tubular membrane assembly holes corresponding to the locating holes in the spacer plates, (e) for each tubular membrane assembly, two support sleeves, with a support sleeve in each end of a tubular membrane assembly, the support sleeves slidably fitting in end portions of the bores of the tubular membrane assemblies and having collar portions outside the tubular membrane assemblies and located against the step in the stepped holes in the sealing plates, (f) means sealing the tubular membrane assemblies to the spacer plates and the sealing plates by being compressed around portions of each tubular membrane assembly that are supported by a support sleeve, (g) means sealing the sealing plates to the flanges, (h) means clamping the spacer plates and the sealing plates together, (i) means clamping the sealing plates to the flanges, and (j) tubular membrane assembly spacing means located intermediate the length of the tubular casing.

Preferably the sealing means sealing the tubular membrane assemblies to the spacer plates comprise "O"-rings around each membrane assembly, and the supporting sleeves are barrel-shaped for ease of insertion in the ends of the tubular polymeric membranes and for clamping the tubular membrane assemblies to the supporting sleeves by means of the "O"-rings.

In some embodiments of the present invention the module includes two header plates clamped to the sealing plates, the header plates having liquid inlets to a bore of one of the tubular membranes and liquid passages connecting the bores of the other tubular membrane assemblies in series, and means sealing the header plates to the header plates to the sealing plates.

In the accompanying drawings which illustrate, by way of example, an embodiment of the present invention, FIG. 1 is an exploded, corner view of an ultrafiltration and reverse osmosis tubular membrane module with portions removed from the lower end, FIG. 2 is an enlarged plan view along II—II, FIG. 1 with parts assembled, FIG. 3 is a sectional side view along III—III, FIG. 2 of an upper portion of the module with two of the tubular membrane assemblies removed, and FIG. 4 is a corner view revealing the underside of a header plate.

Referring now to FIGS. 1 to 3, it will be appreciated that both ends of the module are identical and so the following description of the upper end of the module and the illustration thereof in FIGS. 1 to 3 is relied upon to describe and depict the lower end of the module.

In FIGS. 1 to 4 there is shown an ultrafiltration and reverse osmosis tubular membrane module, comprising:

(a) an elongated, open ended, tubular casing 1 having a liquid outlet 2 for permeate, connecting flanges 4 and 6 at each end, and stepped bore portions, such as 8 (FIG. 3), at each end, (b) a plurality of tubular membrane assemblies 10 to 12 (FIG. 1) each comprising, as shown in FIG. 3, an inner, membrane tube, such as 14 (shown dotted in FIG. 3) and an outer porous, support tube, such as 16, supporting the membrane tube 14, each tubular membrane assembly 10 to 12 extending along, and out of each end of, the casing 1, (c) two spacer plates, such as 18, each having, for each tubular membrane assembly, such as 10 (FIG. 3), a tubular membrane assembly locating hole 20, each spacer plate such as 18 being located one at each end of the tubular casing 1 and in the stepped bore portion 8 at that end;

(d) two sealing plates such as 24, one at each end of the tubular casing 1 and covering the spacer plate 18 and the tubular casing flange 4 at that end, the sealing plates such as 24 each having stepped, tubular membrane assembly holes 26 to 28 (FIGS. 1 and 2) corresponding to the locating holes, such as 20, in the spacer plates such as 18, (e) for each tubular membrane assembly 10 to 12, two support sleeves such as 30 to 32 (FIGS. 1 and 2), with a support sleeve in each end of a tubular membrane assembly 10 to 12, the support sleeves slidably fitting in end portions of the bores of the tubular membrane assemblies 10 to 12 and having collar portions 34 to 36 outside the tubular membrane assemblies and located against the step in the stepped holes such as 26 to 28 in the sealing plates such as 24, (f) means such as "O"-ring 38 (FIG. 3) sealing the tubular membrane assemblies such as 10 to the spacer plates such as 18 and the sealing plates such as 24 by being compressed around portions of each tubular membrane assembly 10 to 12 that are supported by a support sleeve such as support sleeves 30 to 32, (g) means such as "O"-ring 40 (FIG. 3) sealing the sealing plates such as 24 to the flanges such as 4, (h) means, such as a plurality of bolts 42 clamping the spacer plates such as 18 and the sealing plates such as 24 together by means of threaded holes 44 in spacer plates such as 18, (i) means, such as a plurality of bolts 46 and nuts 48 clamping the sealing plates such as 24 to the flanges such as 4, and (j) tubular membrane assembly spacing means 50 (FIG. 3) located intermediate the length of the tubular casing 1.

The casing 1 has liquid flushing connections 52 and 54.

The tubular membrane assemblies 10 to 12 may be produced by the apparatus described and claimed in U.S. Pat. No. 4,177,031 (Thayer et al) and for ultrafiltration operations involving pressures greater than 207 kPa gauge ($\sim$30 psig) it may be desirable to wrap each of the tubular membrane assemblies with, for example, stainless steel screening to provide additional support.

The sealing plate tubular membrane assembly holes such as 26 (FIG. 3) have chamfers such as 56 for the "O"-rings such as 38. The "O"-rings such as 40 (FIG. 3) are located in annular slots such as 58 in sealing plate 24. Each sealing plate such as 24 may have a "O"-ring 60 in an annular slot 62 for sealing the sealing plate 24 to, for example a header plate 64 (FIG. 1 and 5) which is also secured by the bolts 46 and nuts 48. The header plate 64 has a liquid inlet 66 to the bore of the tubular membrane assembly 10 and a passage 68 connecting the bores of the tubular membrane assemblies 11 and 12. A similar header plate may be secured to the other end of the module, but rotated through 120° so that the bores of the tubular membrane assemblies 10 to 12 are connected in series for liquid to be filtered. Alternatively, modules may be sealed end-to-end by the sealing plates such as 24 for parallel flow of liquid along the bores of the tubular membrane assemblies 10 to 12.

The support sleeves, such as 30 (FIG. 3) support the tubular membranes, such as 10, against collapse by the pressure of the "O"-ring 38. The support sleeves, such as 30 are preferably made barrel shaped for ease of insertion into the tubular membrane assembly 10 and for clamping the tubular membrane assembly on to the support sleeve 30 by means of the "O"-ring 38.

To assemble the module the ends of the tubular membrane assemblies 10 to 12 are first passed through the spacer plate 18. The "O"-rings such as 38 are then threaded on the tubular membrane assemblies 10 to 12 and the "O"-ring 40 placed around all of the tubular membrane assemblies 10 to 12, and the sealing plate 24 is then placed over the ends of the tubular membrane assemblies 10 to 12. Before any pressure is placed on the "O"-rings, such as 38, by the bolts 42 (FIG. 3) the support sleeves such as 30 are pushed into the ends of the tubular membrane assemblies 10 to 12 to prevent their collapse.

The bolts 42 are then screwed into position to seal the "O"-rings 38 and 40 in position, and the tubular membrane assemblies 10 to 12 are then placed in the casing 1 with the spacer 50 in position. The "O"-ring 60 (FIG. 3) and the header 64 are placed in position and the assembly bolted together by bolts 46 and nuts 48 (FIG. 1).

The module has been found particularly useful for industrial use involving low operating pressures of 690 kPa gauge ($\sim$100 psig) or less.

We claim:

1. An ultrafiltration and reverse osmosis tubular membrane module, comprising:

(a) an elongated, open ended, tubular casing having a liquid outlet, connecting flanges at each end, and stepped bore portions at each end, (b) a plurality of tubular membrane assemblies each comprising an inner, membrane tube and an outer porous, support tube supporting the membrane tube, each tubular membrane assembly extending along, and out of each end of, the casing, (c) two spacer plates each having, for each tubular membrane assembly, a tubular membrane assembly locating hole, each spacer plate being located one at each end of the tubular casing and in the stepped bore portion at that end, (d) two sealing plates, one at each end of the tubular casing and covering the spacer plate and the tubular casing flange at that end, the sealing plates each having stepped, tubular membrane assembly holes corresponding to the locating holes in the spacer plates, (e) for each tubular membrane assembly, two support sleeves, with a support sleeve in each end of a tubular membrane assembly, the support sleeves slidably fitting in end portions of the bores of the tubular membrane assemblies and having collar portions outside the tubular membrane assemblies and located against the step in the stepped holes in the sealing plates, (f) means sealing the tubular membrane assemblies to the spacer plates and the sealing plates by being compressed around portions of each tubular membrane assembly that are supported by a support sleeve, (g) means sealing the sealing plates to the flanges, (h) means clamping the spacer plates and the sealing plates together, (i) means clamping the sealing plates to the flanges, and (j) tubular membrane assembly spacing means located intermediate the length of the tubular casing.

2. A module according to claim 1, wherein the sealing means sealing the tubular membrane assemblies to the spacer plates comprise "O"-rings around each tubular membrane assembly, and the supporting sleeves are barrel-shaped for ease of insertion in the ends of the tubular polymeric membranes and for clamping the tubular membrane assemblies to the supporting sleeves by means of the "O"-rings.

* * * * *